United States Patent [19]

Bell

[11] 4,013,839
[45] Mar. 22, 1977

[54] SYSTEM FOR MONITORING DIALLED TELEPHONE NUMBERS

[75] Inventor: Arthur Stewart Bell, London, England

[73] Assignee: Telstop S.A., Luxembourg, Germany

[22] Filed: Nov. 8, 1974

[21] Appl. No.: 522,129

[52] U.S. Cl. ............................ 179/7 R; 179/1 MN; 179/90 AN
[51] Int. Cl.² .................................... H04M 15/06
[58] Field of Search ........ 179/1 MN, 18 D, 18 DA, 179/27 CB, 90 AW, 90 BB, 90 BD, 7, 7.1 R, 7.1 TP; 340/172.5; 346/136, 137, 25, 29; 235/92 TE

[56] References Cited
UNITED STATES PATENTS

| | | | |
|---|---|---|---|
| 3,495,229 | 2/1970 | Ruchwle | 179/90 BB |
| 3,674,941 | 7/1972 | Guetta | 179/90 AW |
| 3,844,512 | 10/1974 | Fahzewberg | 346/137 |

FOREIGN PATENTS OR APPLICATIONS 1,431,752  2/1966  France ........................ 179/90 BB

*Primary Examiner*—Kathleen H. Claffy
*Assistant Examiner*—Gerald L. Brigance
*Attorney, Agent, or Firm*—Birch, Stewart, Kolasch & Birch

[57] ABSTRACT

A system for monitoring dialled numbers is disclosed which provides a subscriber with a record of numbers dialled over his telephone line or lines. The system provides a monitoring unit inductively coupled to each line which tapes the dial pulses as they are dialled. Also included is a control processing unit which processes the individual tapes to provide a written record. The system thus eliminates the need for duplicating costly equipment such as discriminators and printers at each line.

23 Claims, 4 Drawing Figures

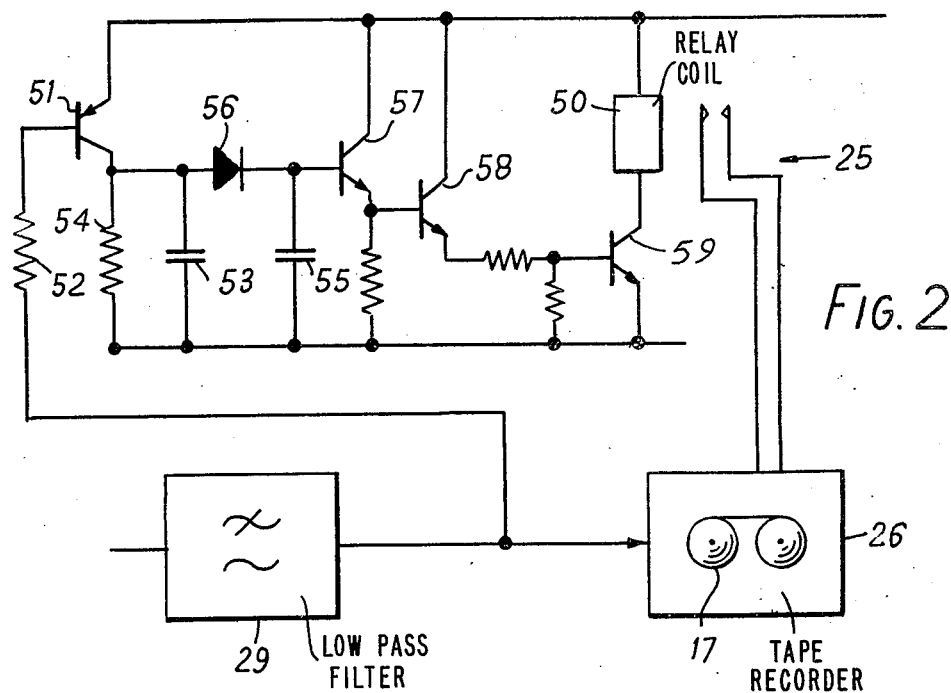
FIG. 2
FIG. 3
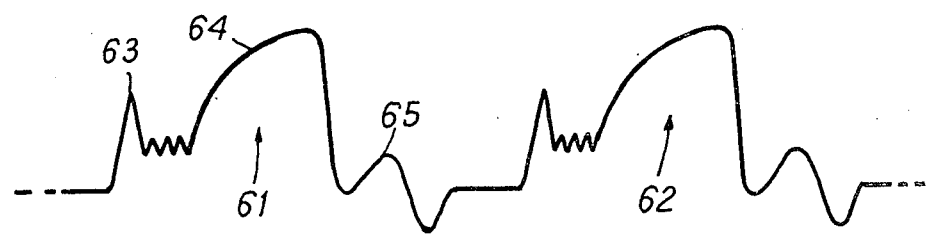

SYSTEM FOR MONITORING DIALLED TELEPHONE NUMBERS

The present invention relates to a system for monitoring numbers dialled over a telephone line.

Now that many international calls can be dialled directly there is a growing need for an employer to be able to keep a check of telephone calls made by employees at his expense. It can be difficult or even impossible to obtain this information from the telephone company.

To be commercially viable a monitoring device must cost the telephone user less than the expected saving in this telephone bill. A major drawback of devices presently available for monitoring telephone lines is that they use some form of automatic printer to display dialled numbers, and at current prices an automatic printer is more expensive than the expected saving to any but the largest telephone users.

Another drawback is that equipment capable of picking out genuine dial pulses from the other pulses which occur on a telephone line tends either to be complicated and expensive or else to be simple but unreliable. In particular an excessive number of "ones" tend to be detected by simple equipment which can be confusing for a user reading the final display.

In a first aspect the present invention provides a system for monitoring numbers dialled over a telephone line, the system comprising at least one recording unit for sensing dial pulses on a monitored telephone line and recording the sensed pulses on a recording medium, and a processing unit for playing-back the recording medium, analysing the recorded dial pulses and producing a display of numbers dialled.

The recording medium is preferably magnetic tape. For convenience and to save expense a standardized cassette of magnetic tape may be used in conjunction with suitable, readily available cassette transport mechanisms. Alternatively a tape cartridge system may be used.

The advantages of this system lie in the fact that the recording units can be made cheaply while the expensive equipment required for the processing unit can be used with recordings from a plurality of recording units. In other words the expensive part of the system can be shared between, say, one hundred recording units, thereby providing a substantial reduction in the cost of the system to any one user.

The recording unit may have a control circuit for starting the recording medium at the beginning of a call on the monitored line and for stopping the recording medium after dialling has been completed.

The completion of dialling may be detected by listening for a tone such as ringing tone, by a time-out which operates when a predetermined period of time has elapsed after the last dial pulse or by a combination of these methods. The time-out is preferably at least 10 seconds long and a preferred length is 20 seconds.

The recording medium may move at such a speed that the maximum recordable frequency is in the lower part of the audio range. A low-pass filter may also be used to ensure recording of low frequency signals only. For example the maximum recordable frequency may be 300 Hz. This will prevent the recording of speech but leaves sufficient bandwidth for the recording of dial pulses.

Moving the recording medium slowly in comparison with the speed required for audio recording also has the advantage of increasing the number of call that can be recorded before the recording medium needs changing.

Another way of preventing the recording of speech is to record only those signals which are at a level above a predetermined threshold level. Roughly speaking, audio signals in a telephone line have an amplitude of 0.1 volts or less, while dial pulses have an amplitude of 10 volts or more, giving a difference in level of at least 20 dB. The predetermined threshold may be adjustable and should lie in the range of 10 dB to 30 dB less than the level of pulses for recordings.

A further drawback with most devices for monitoring a telephone line is that they need to be connected directly to the monitored telephone line. This normally means that an engineer from the telephone company or from a company hiring out the device must call on the user's premises whenever it is desired to monitor a different telephone line. Clearly it is desirable for the user himself to be able to alter the line being monitored.

To overcome this drawback the recording unit may include an inductive pick-up for sensing the signals in the monitored telephone line. The pick-up should preferably be placed near to a point where the wires of the monitored telephone line are not twisted since twisted wires produce a signal which is less clear than the signal produced by untwisted wires. A junction box provides a suitable point, for example. There is no need for the pick-up to be/placed near a telephone connected to the line being monitored.

Care should be taken in the design and construction of the recording unit to ensure that no signal can be transmitted from the pick-up into the monitored telephone line.

The processing unit may include play-back means adjusted to play-back the recording medium at a higher speed than the speed at which the dial pulses were recorded. The play-back speed may be ten or more times the recording speed.

To analyse the recorded dial pulses, i.e., to distinguish dial pulses from other pulses which may be recorded, the processing unit may include a discriminator for detecting the duration of pulses and/or the spacing between pulses (suitable correction being applied if play-back of the recording medium is speeded up). The discriminator may be adapted to pass a first pulse to a counter if it is of a width falling within acceptable tolerances for dial pulses, and thereafter to pass subsequent pulses to the counter only if they are of acceptable widths and if they arrive at acceptable time intervals for dial pulses.

The discriminator may include automatic means responsive to the dial pulses recorded on the recording medium for narrowing the acceptable tolerances in pulse width and pulse spacing so that the discriminator becomes "tuned" to the particular dial which made the recording and hence becomes correspondingly less sensitive to pulses on the monitored line not produced by that dial. After a pause long enough to be an interdigital pause the discriminator must be ready to receive further pulses representative of a possible next digit of a telephone number.

Means may be provided to reset the processing unit to return to a first digit position if the first display digit would otherwise be a "one". In other words the processing unit may be adapted to ignore single pulses, even genuine dialled "ones", until after a digit of two or more has been detected as the first digit to be displayed.

The processing unit may include a printer for simply printing out the detected numbers, or it may include further means for picking-out numbers of a predetermined category. The numbers picked-out may be the only ones printed or they may be printed in a distinctive colour such as red.

A typical predetermined category of numbers are numbers for trunk calls and for international calls. These may be detected by recognising an initial trunk prefix digit such as "O" or by their length (e.g. numbers more than seven digits long) or by a combination of both these methods. A more complicated unit may alternatively check the numbers dialled against a list of "permitted" numbers and pick out any numbers not included in the list.

The processing unit may be subdivided into a plurality of devices for play-back and number detection while using a single printing device. The single printing device may consist of a computer which may also provide a picking-out function.

In a second aspect the present invention provides a recording unit for use in a system for monitoring numbers dialled over a monitored telephone line, the recording unit comprising an inductive pick-up for sensing signals in the monitored telephone line, recording means for recording dial pulses sensed by the pick-up and an automatic control circuit for starting the recording means at the beginning of a call on the monitored telephone line and for stopping the recording means after dialling has been completed.

In a third aspect the present invention provides a processing unit for use in a system for monitoring numbers dialled over a monitored telephone line, the processing unit comprising play-back means for playing-back a recording medium on which dial pulses from the monitored telephone line have been recorded, a discriminator for accepting recorded pulses which fall within acceptable dial pulse tolerances, a counter for counting dial pulses accepted by the discriminator and an automatic printer responsive to the counter for displaying the numbers dialled over the monitored telephone line.

The units of the second and third aspects of the present invention may include appropriate preferred features already mentioned in relation to the system of the first aspect of the present invention.

No mention has been made above of recording the duration of dialled calls. This is because it has been appreciated that a record of the duration of a call is not an essential feature of the kind of monitoring for which the present invention is intended. As a general rule the accuracy of the telephone company's bill is not being questioned, since the monitoring is being carried out to determine which employees are dialling what undesired calls.

By not attempting to detect or to display the duration of any calls both the recording unit and the processing unit can be made more cheaply than would otherwise be possible.

An embodiment of a system for monitoring numbers dialled over a telephone line, including a recording unit and a processing unit will now be described by way of example with reference to the accompanying drawings in which:

FIG. 2 shows a circuit diagram for a control circuit of a recording unit;

FIG. 3 shows a waveform diagram of two dial pulses as detected; and

Figure 1:
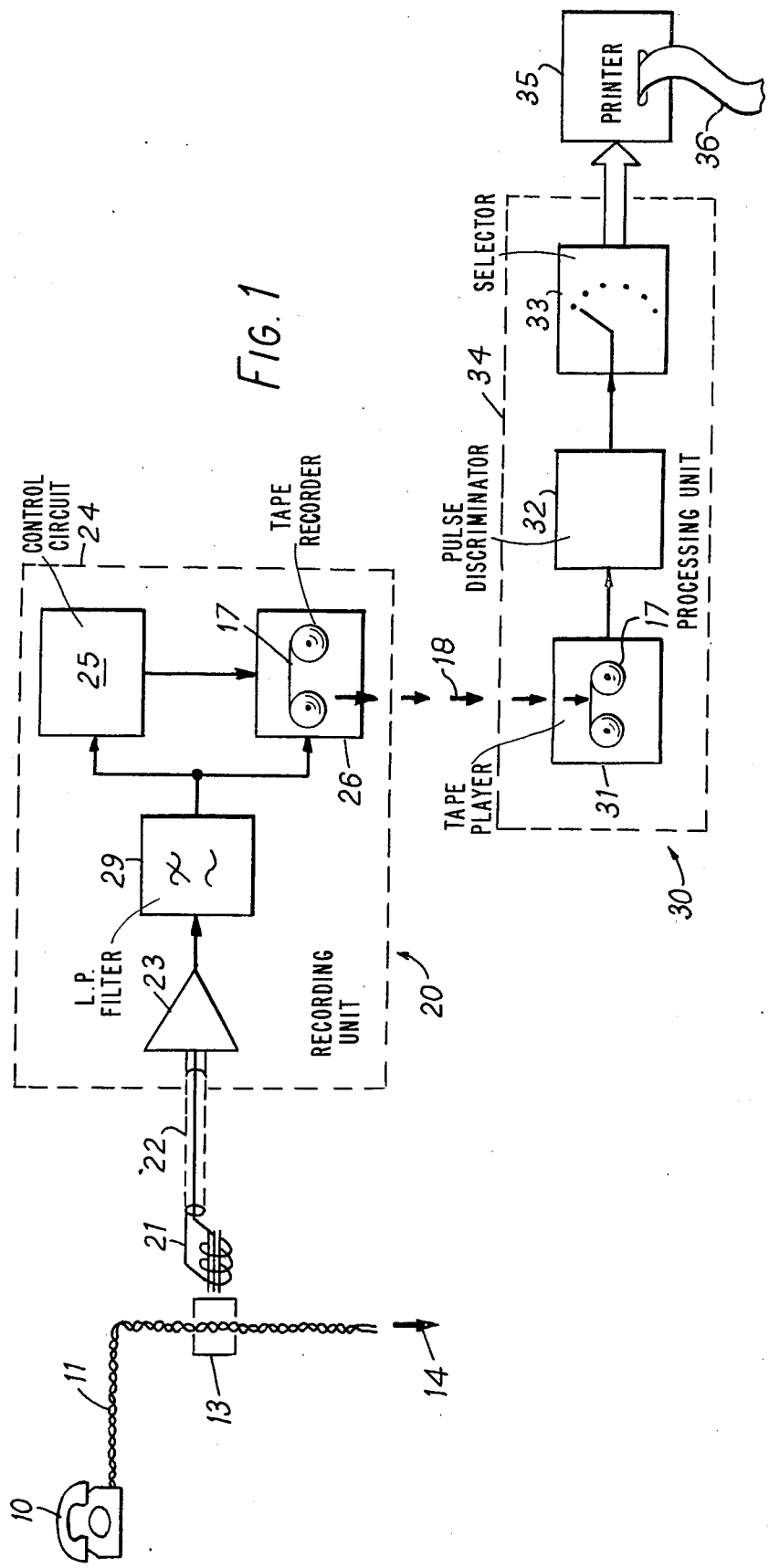
FIG. 1 shows a block diagram for the whole system.

Referring to FIG. 1 a telephone 10 is shown connected to a telephone line 11. The telephone line 11 is shown having a pair of twisted wires but these follow an untwisted path through a junction box 13. The telephone line 11 is connected to a telephone exchange in the direction of an arrow 14.

A recording unit 20 comprises an inductive pick-up 21 connected by a screened cable 22 to an amplifier 23 housed in a box indicated by a dashed line 24. The amplifier output is fed via a low-pass filter 29 to a control circuit 25 and to a tape recorder 26 both of which are contained in the same box 24. The control circuit 25 is arranged to turn on the tape recorder 26 while the telephone 10 is being used for dialling and to turn off the tape recorder 26 after dialling has been completed. The tape recorder 26 uses a tape cassette 17 which may be transferred to a processing unit 30 as indicated by arrows 18.

The pick-up 21 is shown placed next to the junction box 13 because untwisted telephone wires radiate a signal for the pick-up 21 to detect which is clearer than the signal which is radiated by the twisted wires. The low-pass filter 29 is to ensure that there is no possibility of recording speech as well as dial pulses.

The processing unit 30 has a tape player 31 (shown including the tape cassette 17) feeding a discriminator 32. Pulses accepted by the discriminator 32 are counted by counters selected by a selector circuit 33 and when the end of a number is detected the counter totals are printed on a reel of paper 36 by a printer 35. Thereafter, in preparation for the next number, the printer 35 moves on one line, the counters are reset and the selector circuit 33 returns to a position in which it is selecting a first one of the counters. The processing unit 30 is shown with the printer 35 separate from its other elements since the printer 35 is preferably a commercially available unit which includes its own counters.

The control circuit 25 of the recording unit 20 consists of a peak rectifier-and-hold circuit as shown in FIG. 2. Detected pulses cause a capacitor to charge and turn on a relay 50 which controls the motor of the tape recorder 26. A predetermined length of time after the last pulse the capacitor discharges far enough to cause the relay 50 to turn off and hence stop the motor of the tape recorder 26.

The detail operation is as follows: — the output of the filter 29 is applied to the base of a PNP transistor 51 via a resistor 52. Provided the pulse is of sufficient magnitude the transistor 51 turns on and charges a capacitor 53 in its collector circuit. The capacitor 53 can discharge through a parallel resistor 54. The potential on the capacitor 53 is transferred to a second capacitor 55 via a diode 56. The potential on the second capacitor 55 is used to turn on an amplifier including three NPN transistors 57, 58 and 59; the collector circuit of the transistor 59 including the operating coil of the relay 50. The predetermined length of time after the last pulse before the relay 50 is de-energized is determined by the capacitance of the second capacitor 55 and the base-emitter current of the transistor 57; it should be about twenty seconds long. The time constant of the capacitor 53 and the resistor 54 is chosen so that there is ample time for the capacitor 53 to charge the second capacitor 55 via the diode 56. The output of the low-pass filter 29 is biassed so that signals which are not as large as dial pulses do not cause the transistor 51 to conduct and do not therefore trigger the tape recorder 26 into unnecessary recording. The tape recorder 26 is turned on by the initial surge of current down the telephone line 11 when the telephone is picked up, and is kept turned on by the dial pulses. The predetermined period starts running from the beginning again after each dial pulse so there is always a twenty-second gap of empty tape after the last pulse.

The amplifier 23 and the tape recorder 26 is constituted by a commercially available cassette tape recorder. The most important modification to be made to the tape recorder is to make it run at one tenth the usual speed i.e., at 0.48 cm/sec. while recording. The primary object of slow running is to make the tape last longer and this is possible since it is only dial pulses which it is intended to record and not speech. It is very difficult to understand speech from which all the high frequency parts of the audio signal above, say, 1,200 Hz. have been removed. Furthermore, audio signals on a telephone line are at a much lower level than dial pulses, so any speech that may be recorded will be almost certainly lost in tape hiss. However, to ensure that no intelligible speech is recorded at all, the low-pass filter 29 is inserted in the input circuit of the tape recorder 26 so that all signals in the usual telephone passband of 300 Hz to 4000 Hz are lost. A preferred upper frequency limit for the low-pass filter 29 is 200 Hz.

Since many recording units can work with one processing unit it is important that the recording units are as cheap as possible. The embodiment described has therefore used a commercially available tape recorder and added a few modifications as simply and as cheaply as possible. A more complicated recording unit can be devised. It may include circuits for detecting tones to indicate the beginning or the end of dialling, or circuits for putting various control signals onto the tape to assist the processing unit. Such modifications are not used in the preferred embodiment for reasons of expense.

The tape produced by the recording unit will have sequences of pulses recorded on it with blank pauses of 20 seconds separating the sequences relating to different calls. FIG. 3 shows two typical recorded dial pulses 61 and 62. Each pulse starts with an initial spike 63, continues with a main, central portion 64, starts to fall and ends with a small "bounce" connection 65. The next pulse starts at a fixed length of time after the beginning of the previous pulse. In general the shape of dial pulses from various dials varies considerably because of varying degrees of contact wear. The spacing of pulses is, however, generally more constant, since it is controlled by a governor in each telephone dial, and the governor is normally adjusted against a standard.

The processing unit 30 must thus be able to recognise a ragged dial pulse 61 as a single pulse, interpret correctly the difference between a short pause between adjacent dial pulses and a longer pause between different dialled digits, and detect the long (20 second) pause indicating the end of a complete number.

Figure 4:
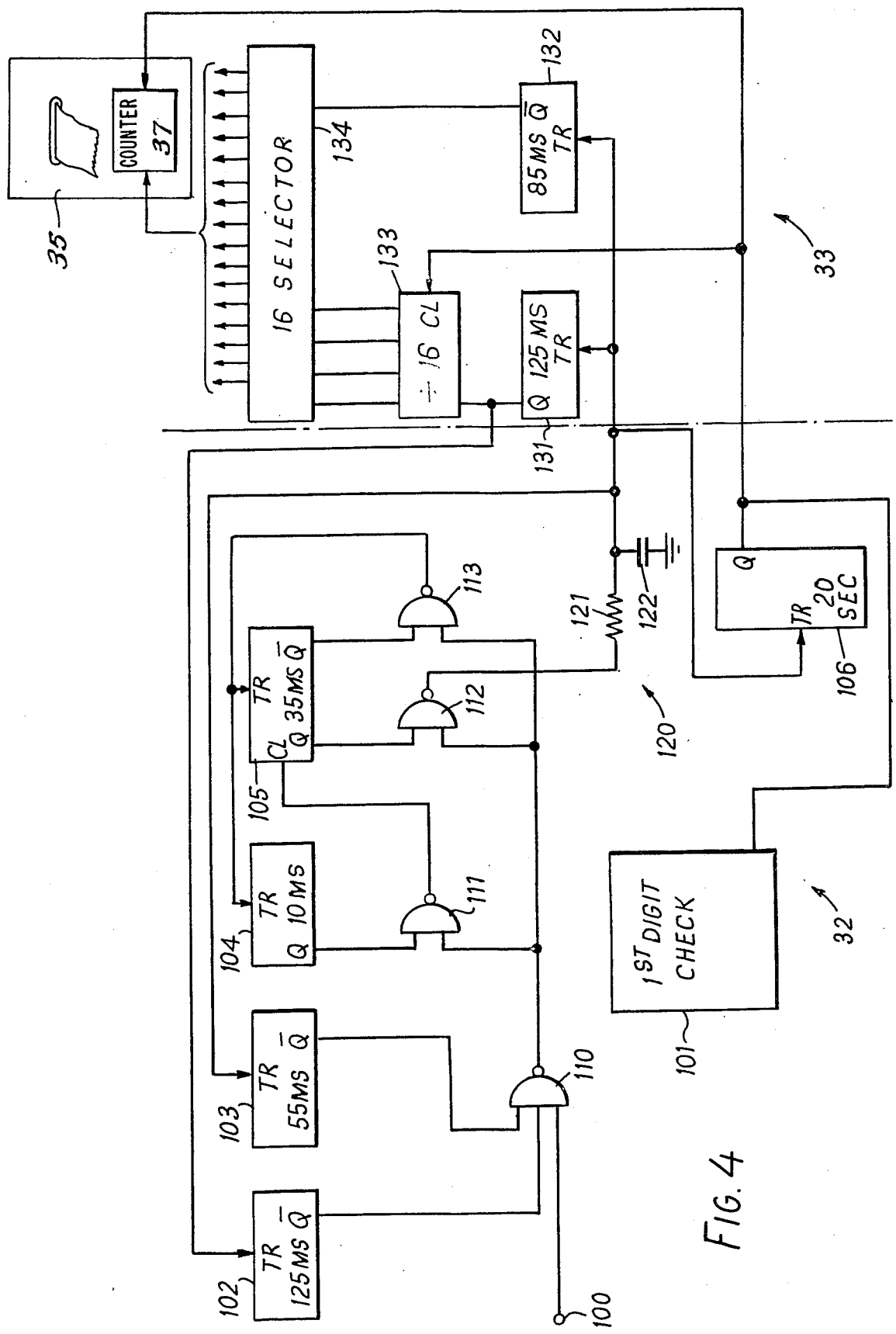
FIG. 4 shows a block diagram for a discriminator of a processing system.

FIG. 4 shows a block diagram of a discriminator for performing these functions. The periods of time which will be used in the description below relate to real dialling time, but in a processing unit which plays back the tapes at a higher speed than that at which they were recorded, the periods are naturally reduced by the same proportion as the tape is speeded up. Thus in the preferred embodiment the tape is played at ten times the recording speed (i.e., at 4.8 cm/sec.) and the periods of time are, in fact, 1/10th those indicated below.

Positive-going pulses from the tape player 31 are applied to the discriminator 32 via an input 100 connected to a NAND-gate 110. The NAND-gate 110 has two other inputs connected to the $\overline{Q}$ outputs of monostables 102 and 103 which are respectively arranged to close the gate 110 in the pauses between dialled digits and in the pauses between successive dial pulses of the same digit. Pulses which pass through the NAND-gate 110 are applied as negative going pulses to one input each of three two-input NAND-gates 111, 112 and 113.

The other input of the gate 111 is connected to the Q output of a monostable 104, the other input of the gate 112 is connected to the Q output of a monostable 105 and the other input of the gate 113 is connected to the $\overline{Q}$ output of the monostable 105. All the monostables 102, 103, 104 and 105 are TTL 74123-type re-triggerable monostables arranged to be triggered by positive going edges. The operation of the discriminator circuits described so far is as follows:

Assuming all four monostables are initially in the OFF state the gates 110 and 113 are open while the gates 111 and 112 are closed. A positive going pulse at the input 100 appears as a negative going pulse at the output of the gate 110 which causes a positive going edge in the output of the gate 113 thereby triggering the monostables 104 and 105 to the ON-state. So long as the monostables 104 and 105 remain ON and the pulse continues to be present at the output of the gate 110 the outputs of the gates 111, 112 and 113 all remain high.

If the pulse is too short the monostables 104 and 105 are both still in the ON state when the pulse ends so a negative output is produced from the gates 111 and 112. The gate 111 is connected to clear the monostable 105 and thereby returns the output of the gate 112 to positive. A very short (70 ns or less regardless of tape play-back speed) negative pulse which nonetheless appears at the output of the gate 112 is blocked by a low-pass filter 120 comprising a resistor 121 and a capacitor 122. The discriminator remains insensitive to further pulses until the monostable 104 returns to the OFF state. The period of the monostable 104 is 10 ms and it serves to prevent the processing unit responding to input spikes such as the spike 63 (FIG. 3).

If the pulse is of an acceptable length the monostable 104 turns OFF before the end of the pulse but the pulse ends before the monostable 105 turns OFF. In this case a negative going pulse appears at the output of the gate 112 for the period between the end of the dial pulse and the monostable 105 turning off. This period is several milliseconds and the pulse at the output of the gate 112 passes through the low-pass filter 120 to the selector circuit 33 and also to trigger the monostable 103 (at the instant the monostable 105 turns OFF.) The monostable 105 has a period of 35 ms for detecting the central portion 64 of a dial pulse and the monostable 103 has a period of 55ms for preventing any further pulses passing through the gate 110 until the beginning of the next dial pulse can be expected. This 55 ms period ensures that the bounce portion 65 of each dial pulse is ignored.

A pulse which is longer than the 35 ms duration of the monostable 105 causes no output at all from the gate 112 since there is always at least one of the inputs to the gate 112 at the low state. After the end of a long pulse (such as may be produced by the initial surge of current in the monitored telephone line) the discriminator is immediately ready to receive the next pulse.

Accepted pulses pass to the selector circuit 33 to trigger two retriggerable monostables 131 and 132 arranged for triggering on negative-going edges. The monostable 131 has a period of 125 ms and detects the pauses between digits. Its output is arranged to be counted in a 16 state counter 133 and to trigger the monostable 102 which also has a 125 ms period. The counter 133 controls a one-out-of-sixteen selector 134 to select one out of sixteen driver circuits for operating electro-mechanical stepping circuits in the printer 35. The output of the monostable 132 is also applied to the selector 134 and is applied therethrough to the selected one of the stepping circuits (counters) 37 in the printer 35. The period of the monostable 132 is 85 ms and serves as a further precaution against pulses which are too close together being detected as more than a single pulse.

The monostable 102 serves to close the gate 110 until the end of an inter-digital pause once this has been detected by the monostable 131.

In a more sophisticated system the periods of the monostables 102, 103, 104, 105, 131 and 132 can be automatically adjusted to match the characteristics of a particular dial whose pulses are recorded on the tape. In the simple system a tolerance on pulse rate of 90% to 125% is allowed (period of monostables 105 + 103 and 131) in order to cater for the variety of pulse rates which may be found. But for any one dial the pulse rate is very steady and much narrower tolerances can be used. The object of adjusting the discriminator 32 to dial pulses (either in general or to a particular dial) is to render the system insensitive to other kinds of pulse.

Accepted pulses also trigger a monostable 106 which has a period just slightly less than the predetermined period of the control circuit 25, i.e., about 20 seconds. After no dial pulses have been detected for twenty seconds the printer 35 is caused to operate and the counter 133 is reset to zero. The monostable 106 can be embodied by an oscillator and a counter if its period is too long to be readily provided by an RC time constant.

A logic circuit 101 is included in the discriminator 32 for checking if the first digit of a number in the printer 35 is a 1. If it is a 1 the counter 133 is reset to zero and the printer 35 is reset to blank without moving the paper 36. This process continues until the first digit is recorded as some other number. Ones recorded in subsequent positions are left unaltered. The object is to prevent odd pulses such as the connect surge or a disconnect surge from being printed as dialled digits. The drawback is that service numbers starting with a 1 will be printed wrongly. Thus a call to an operator on 100 will appear as 00 and a call to the speaking clock on 123 as 23. However it has been found that users are not confused by the occasional fore-shortening of a printed number while they find it inconvenient mentally to remove an arbitrary number of ones from the beginning of a printed number. There is also the undesirable possibility of a dialled number becoming unacceptably long for the printer 35 if too many ones are tagged onto its beginning.

The printer 35 can be adapted so that a red ribbon is used for printing in certain circumstances. It can be arranged to do this when a trunk call is dialled (by detecting an initial trunk prefix such as 0) or when a particular combination of the first three digits is detected (e.g. 246 for calls to recorded services in London).

In an alternative embodiment using a paper-tape punch, a counter is connected to the output of the monostable 132 to set the number punched and the output of the monostable 131 is used to operate the punch and reset the said counter. The output of the monostable 106 is used to punch an "end of number" code on the tape. The punched paper tape is then used as input to a computer which can include programs for performing any desired checks on the numbers. The computer can be programmed to perform the initial "one" check and the logic circuit 101 may be omitted.

I claim:

1. A system for monitoring numbers dialled over a telephone line the system comprising at least one recording means for sensing dial pulses representative of numbers dialled as well as pulses bearing no relationship to to said numbers dialled on a monitored telephone line and for recording each of the sensed pulses on a recording medium, and processing means for playing-back the recorded pulses on the recording medium, for analysing the pulses recorded thereon to determine the numbers dialled on the monitored line and for producing a display of numbers dialled.

2. A system according to claim 1 wherein the recording medium is magnetic tape.

3. A system according to claim 2 wherein the magnetic tape is contained in a standardized cassette.

4. A system according to claim 2 wherein the magnetic tape is contained in a standardized cartridge.

5. A system according to claim 1 wherein the recording means has a control circuit for starting the recording at the beginning of a call on the monitored line and for stopping the recording after dialling has been completed.

6. A system according to claim 5 wherein the control circuit includes a time-out circuit arranged to stop the recording when a predetermined period of time has elapsed after the last sensed pulse.

7. A system according to claim 6 wherein the predetermined period of time is at least ten seconds.

8. A system according to claim 1 wherein the recording means has a maximum recordable frequency which is in the lower part of the audio range.

9. A system according to claim 8 wherein the maximum recordable frequency is determined by the speed at which the recording medium is used.

10. A system according to claim 8 including a low pass filter to determine the maximum recordable frequency.

11. A system according to claim 8 wherein the maximum recordable frequency is 600 Hz or less.

12. A system according to claim 1 wherein the recording means is adapted only to record signals on its monitored telephone line which are above a predetermined threshold level lying in the range of 10dB to 30dB less than the level of dial pulses on the line.

13. A system according to claim 1 wherein the recording means includes an inductive pick-up for sensing dial pulses on the monitored telephone line.

14. A system according to claim 1 wherein the processing means includes play-back means adjusted to play-back the recording medium at a higher speed than the speed at which the dial pulses are recorded.

15. A system according to claim 14 wherein the said play-back speed is five or more times the recording speed.

16. A system according to claim 1 wherein the processing means includes a pulse discriminator and a counter, the discriminator being arranged to analyse the recorded pulses by determining the duration of recorded pulses and passing recorded pulses to the counter only if the recorded pulses are of a duration falling within acceptable tolerance for dial pulses.

17. A system according to claim 16 wherein the discriminator further includes means for determining the spacing of dial pulses and for passing pulses after the first pulse of any dialled digit to the counter only if they also arrive at time intervals with acceptable tolerances for dial pulses.

18. A system according to claim 1 wherein the processing means is arranged to ignore single pulses in any recorded number until after a digit of two or more pulses is detected.

19. A system according to claim 1 wherein said recording means includes a plurality of recording units for sensing said pulses on a plurality of respective monitored telephone lines and for recording each sensed pulse on a respective recording media, said processing unit playing back and analyzing the pulses on each of said recording media.

20. A recording unit for use in a system for monitoring numbers dialled over a monitored telephone line, the recording unit comprising:

means for constraining a portion of the individual conductors of the telephone line in an untwisted state;

an inductive pick-up for sensing signals in said portion of the monitored telephone line;

recording means for recording pulses sensed by the pick-up; and an automatic control circuit for starting the recording means at the beginning of a call on the monitored telephone line and for stopping the recording means after dialling has been completed.

21. A processing unit for use in a system for monitoring numbers dialled over monitored telephone lines, the processing unit comprising play-back means for playing-back a recording medium on which pulses including dial pulses from the monitored telephone line have been recorded, a discriminator for accepting recorded pulses which fall within acceptable dial pulse tolerances, a counter for counting dial pulses accepted by the discriminator and an automatic printer responsive to the counter for displaying the numbers dialled over the monitored telephone lines.

22. A system for monitoring numbers dialled over a telephone line, the system comprising at least one recording unit for sensing dial pulses on a monitored telephone line and for recording the sensed pulses on a recording medium, a processing unit for playing-back the recording medium, analysing the recorded dial pulses and producing a display of numbers dialled, said recording unit including means for only recording signals on the monitored telephone line which are above a predetermined threshold level in the range of 10dB to 30dB less than the level of the dial pulses.

23. A system for monitoring numbers dialled over a telephone line, the system comprising at least one recording unit for sensing dial pulses on a monitored telephone line and for recording the sensed pulses on a recording medium, and a processing unit for playing-back the recording medium, analysing the recorded dial pulses and producing a display of numbers dialled, said processing unit including means for ignoring single pulses in any recorded number until after a digit of two or more pulses is detected.

* * * * *